US005846412A

United States Patent [19]

Tharp

[11] Patent Number: 5,846,412

[45] Date of Patent: Dec. 8, 1998

[54] DIFFUSER CONSTRUCTION AND MOUNTING ARRANGEMENT

[75] Inventor: Charles E. Tharp, Columbia, Mo.

[73] Assignee: Environmental Dynamics, Inc., Columbia, Mo.

[21] Appl. No.: 560,442

[22] Filed: Nov. 17, 1995

[51] Int. Cl.[6] .................................. C02F 3/20; B01F 3/04

[52] U.S. Cl. ....................... 210/220; 261/122.2; 261/124; 285/5; 285/156; 285/197; 285/373; 285/419; 285/420; 285/421

[58] Field of Search ......................... 210/220; 261/122.1, 261/124, 122.2; 285/373, 420, 419, 197, 5, 156, 421

[56] References Cited

U.S. PATENT DOCUMENTS

| | | |
|---|---|---|
| 3,315,895 | 4/1967 | Klingbeil . |
| 3,489,441 | 1/1970 | Malcolm . |
| 3,501,133 | 3/1970 | Dreier et al. . |
| 3,530,990 | 9/1970 | Grimshaw . |
| 3,918,748 | 11/1975 | Acda . |
| 3,953,553 | 4/1976 | Thayer . |
| 3,976,314 | 8/1976 | Graham . |
| 4,018,464 | 4/1977 | Acda . |
| 4,059,291 | 11/1977 | Acda . |
| 4,060,486 | 11/1977 | Schreiber . |
| 4,158,461 | 6/1979 | Francis . |
| 4,165,286 | 8/1979 | Schreiber . |
| 4,273,364 | 6/1981 | de Lange . |
| 4,391,458 | 7/1983 | Blakeley . |
| 4,521,037 | 6/1985 | Knox . |
| 4,563,277 | 1/1986 | Tharp . |
| 4,818,446 | 4/1989 | Schreiber et al. . |
| 4,960,546 | 10/1990 | Tharp . |

FOREIGN PATENT DOCUMENTS

| | | |
|---|---|---|
| 464620 | 12/1968 | Switzerland . |
| 1404864 | 9/1975 | United Kingdom . |

OTHER PUBLICATIONS

Envirex Bulletin No. 315–14C2, Sep. 1987, entitled "Finance Your Retrofit Through This New Guaranteed Power Savings Program".

Envirex Bulletin No. 315–14C1, Oct. 1986, entitled "Fine Bubble Membrane Diffusers for Non–Clogging Energy Efficient Aeration".

Flo Control, Inc. Price List, effective Dec. 1, 1992.

Nopol Aeration Systems brochure dated Oct. 1993 entitled "Efficiency, Reliability, Fleibility".

Schreiber brochure entitled "Schreiber Pretreatment System—A Combination Air Degritter and Grease Removal Unit That Performs a Complete Job".

Aeration Technologies, Inc. brochure entitled "Aermax—Fine Pore Diffusers".

Aeration Technologies, Inc. Fig. 202, dated Oct. 1987 entitled "Aermax TPD Diffuser—D Series".

Sanitaire Drawing Job No. 72–227, Sheet E–3, dated Nov. 15, 1972.

Sanitaire Drawing Job No. 72–227, Sheet E–4, dated Dec. 2, 1972.

Schreiber Drawing dated Mar. 2, 1982.

Schreiber Drawing No. 41–2600–00025 dated Mar. 4, 1991.

GVA Elastox–P Rubber membrane diffuser Technical information literature.

*Primary Examiner*—Thomas M. Lithgow

*Attorney, Agent, or Firm*—Shook, Hardy & Bacon L.L.P.

[57] ABSTRACT

An improved air diffuser and mounting arrangement for mounting diffusers on submerged air laterals in a wastewater treatment system. The diffuser is formed form a cylindrical pipe which is flattened on most of its length but left partially cylindrical for convenient mounting. The mounting arrangement includes a removable saddle on the air lateral and a Tee fitting for mounting the diffusers. The saddle has an outlet spout which fits directly against and is connected directly to an inlet leg of the Tee fitting. The saddle construction in one form accommodates either standard U.S. or metric pipe fittings and in another form accommodates two different sizes of pipe fittings.

5 Claims, 3 Drawing Sheets

Fig. 4.
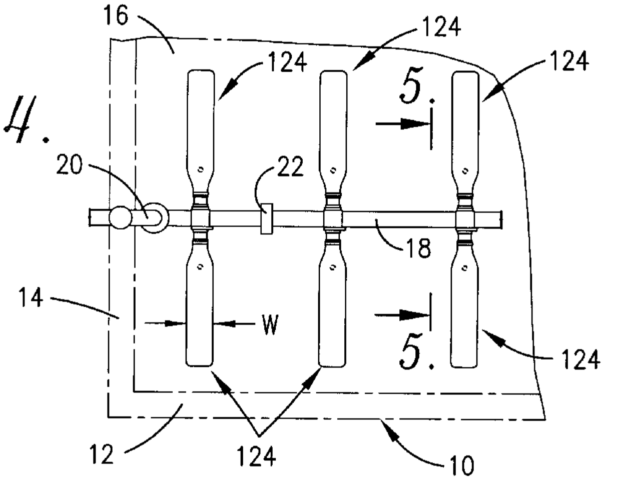
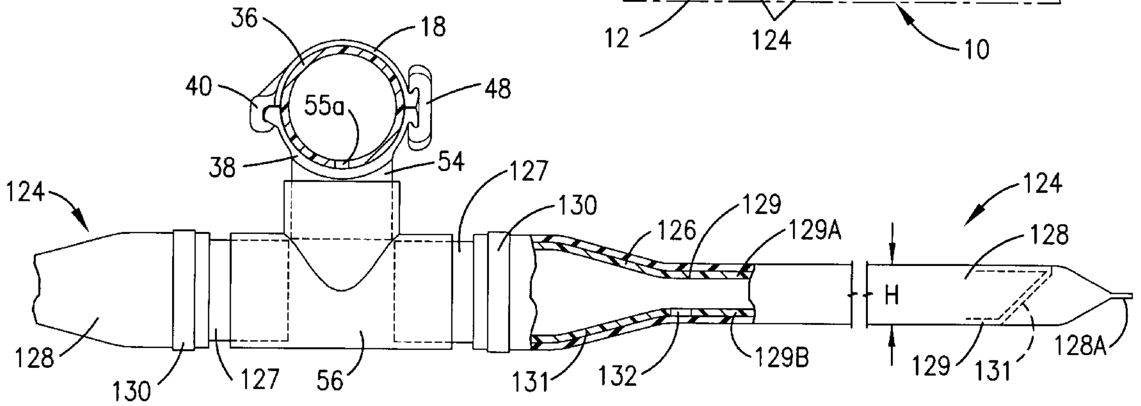
Fig. 5.
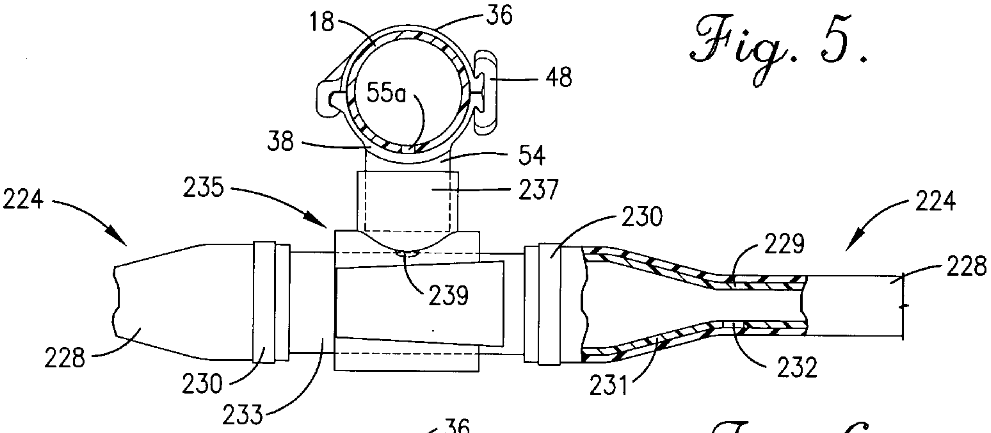
Fig. 6.
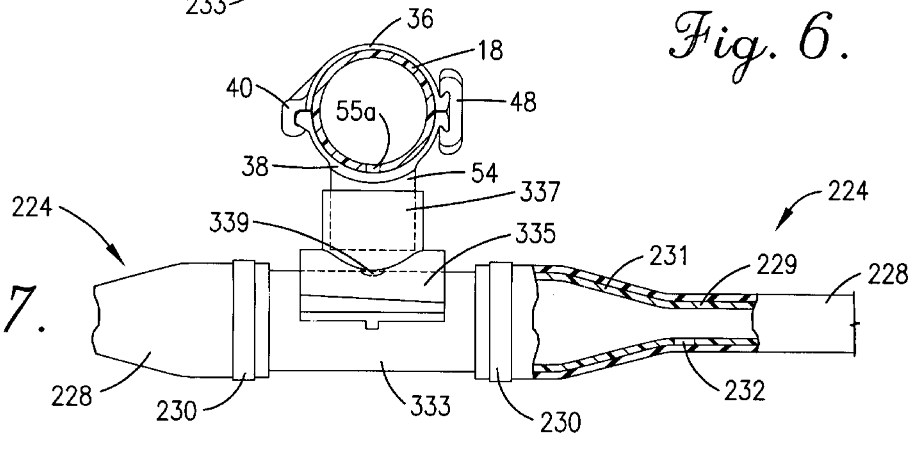
Fig. 7.

DIFFUSER CONSTRUCTION AND MOUNTING ARRANGEMENT

FIELD OF THE INVENTION

This invention relates generally to the treatment of wastewater and more specifically to the diffusion of air into wastewater. The invention deals in particular with improved arrangements for mounting tubular diffusers to air supply piping and with an improved diffuser construction that takes advantage of the desirable features of both cylindrical and flat diffusers.

BACKGROUND OF THE INVENTION

In the treatment of wastewater, it is common practice to make use of aeration equipment that aerates and mixes the wastewater. Typically, the aeration equipment includes one or more air supply pipes which may be submerged near the bottom of the basin which holds the wastewater, may be submerged at a mid-depth position, or may float on the surface. Diffusers of various types are used to discharge the air into the treatment basin. One type of diffuser that has been popular is a flexible membrane diffuser. It is presently available primarily in three different types.

One type of flexible membrane diffuser is a tubular configuration which has an elongated tube for its body and a flexible membrane which is sleeved onto the tube. The membrane has fine apertures which open when air pressure is applied, and the air discharges through the apertures into the wastewater in the form of fine bubbles.

A second type of flexible membrane diffuser is a disk diffuser having a circular shape and a diameter normally in the range of 7–24 inches. A single layer membrane is stretched across a circular frame and clamped to the frame at its edges. Air supplied beneath the membrane causes the membrane to expand, thus opening apertures in it so that the air is released into the water as fine bubbles.

The third type of flexible membrane diffuser is a panel unit which includes a large rectangular frame typically 3–4 feet wide and 8–10 feet long. A single sheet high strength membrane is stretched over the frame and secured to it at the membrane edges in a manner to seal the edges against air leakage. Cross members are also required across the frame to restrain and support the membrane. The membrane is subjected to considerable stress during service and can be deflected excessively and stressed to the point of malfunction if not adequately supported. The stress can easily lead to ineffective air distribution and loss of diffuser efficiency.

Each type of flexible membrane diffuser has advantages and disadvantages. Tubular diffusers provide enhanced mixing of the wastewater and beneficial operating characteristics when the wastewater includes a high content of solids that must be aerated and mixed. Tubular diffusers also exhibit good structural properties and minimize stress on the membrane because of the interior support provided by the tube beneath the entire membrane surface. Although the oxygen transfer efficiency of tubular diffusers is comparable to that of other devices, it is necessary to employ a greater number of tube diffusers and a greater membrane surface area to provide the same oxygen transfer capability.

Disk diffusers offer a high oxygen transfer efficiency, in part because the membrane is flat and maintains uniform air distribution over its surface. Higher efficiency also results from the minimal circulation and pumpage of liquid. The disk diffuser is mounted on top of the supply piping and releases all of the air from the top of the diffuser.

Consequently, the upward flow of liquid past the diffuser is impeded and there is no air released beneath the diffuser body to accelerate around the diffuser and create a high upward liquid velocity. This results in a minimal liquid pumpage and increases the bubble residence time so that the transfer efficiency is increased as well. Disk diffusers are disadvantageous because they are relatively small and require large amounts of supply piping which increases the initial cost. The need to maintain a large number of diffusers and pipes is also a significant problem.

The large panel diffusers are used primarily in what is known as full floor cover applications. In this type of application, as much as 80% of the area of the basin floor is covered with diffusers. Full floor coverage basins minimizes the liquid pumpage to enhance the oxygen transfer, again because the air bubble residence time is increased when the upward liquid velocity is decreased. The enhanced oxygen efficiency transfer reduces the energy costs, often by about 50%.

In contrast to the full floor coverage application in which membrane panel diffusers are typically used, the active membrane surface of tube and disk type membrane diffusers is normally only about 5%–25% of the basin floor surface area. Because of this, the pumpage is considerably more than in the case of a full floor coverage basin. As previously indicated, the pumpage rate for tube diffusers is greater than for disk diffusers. Although this makes the tube diffusers well suited for handling high solids content where mixing is of great importance, the oxygen transfer efficiency suffers and is slightly lower than the disk diffuser (for the same amount of active membrane surface), and considerably lower than in the case of a full floor coverage basin.

It is possible to use tube diffusers or disk diffusers in a full floor cover arrangement. However, this requires that the number of diffusers be increased (to increase the floor cover and spread the energy), and the initial equipment cost is increased accordingly. In the case of disk diffusers, the amount of piping and number of diffusers required to achieve 70% floor cover make such a system so costly both in terms of equipment and maintenance that it is impractical.

Although panel units have been used in full floor cover applications to good advantage from an oxygen transfer standpoint, they are plagued by numerous problems in other respects. The large panels must rest on the basin floor whereas the blowers of existing plants are typically designed to deliver air at a depth of about two feet above the floor. Thus, new blowers are needed if panels are to be installed in an existing basin. Because of the membrane deflection and the low air flow rates used with panel diffusers, a high pressure drop through the membrane is necessary to achieve the uniform air distribution that is vital to achieving high oxygen transfer efficiency. Along the same lines, the distribution and efficiency suffer if one membrane is lost or torn away, as a large amount of air would be released from the damaged unit due to the absence of a membrane there. Large panels are ill-suited for applications where mixing is important. Solids tend to settle and accumulate on the panel surface where the accumulations can interfere with proper discharge.

The large panels are also expensive. There are significant mechanical difficulties encountered in restraining the large membranes, and the large surface of the membrane subjects it to extreme stresses which are aggravated by the elevated pressures under which the panels operate. Large numbers of bolts and straps are needed to hold the membrane in place and properly restrain it, thus making the panel expensive and the membrane difficult to install and maintain.

Tubular flexible membrane diffusers apply considerable forces during operation of the aeration equipment, and it is thus necessary to mount them to the supply pipe in a manner to withstand the substantial vibrational forces and the flexure and turbulence encountered when the system is operating. U.S. Pat. No. 4,960,546 to Charles E. Tharp discloses one type of mounting arrangement that has been utilized with good results.

Despite the success of this type of unit and the superior performance it has provided, there is always room for improvement. The distance between the saddle body and the body of the Tee fitting normally used to mount the diffusers must be at least as great as the combined length of the saddle outlet spout and the Tee fitting inlet leg. Minimizing this distance is important because it provides a lever arm which applies leverage due to the forces that are encountered during operation of the diffusers. The leverage effect is increased with increasing lever arm length. This distance also determines the minimum elevation of the piping above the floor because the diffusers are normally located below the pipe. It is generally beneficial to locate the supply piping as close to the floor of the basin as possible in order to minimize the size of the brackets used for support of the piping and to strengthen and stabilize the piping system. Consequently, minimizing the distance between the supply pipe and diffuser body is desirable for this reason also.

The mounting assembly of the Tharp patent requires a pipe nipple which may either be glued or threaded (or otherwise connected) to the saddle outlet and to the Tee fitting. The need for the nipple increases the number of parts and requires that two connections be made. This adds to the cost of materials and labor and reduces the reliability because the chance of a connection failing increases with the number of connections that are employed.

The cylindrical configuration of the tubular diffusers that have been used in the past has also created problems, primarily in the areas of uniformity of the air distribution and efficiency of the air application. The air which discharges at the top of a cylindrical diffuser can discharge more easily than the air that discharges at the bottom, due to the differential in submergence between the top and bottom parts of the diffuser. Consequently, more air discharges from the upper part of the diffuser membrane than from the lower part, and the uniformity in the distribution of air suffers accordingly. The bubbles discharging from lower parts of the membrane naturally encounter bubbles discharging from the sides, and these bubbles may coalesce and form larger bubbles when high flow rates are used. This phenomenon reduces the oxygen transfer efficiency because larger bubbles transfer air to the liquid less efficiently than smaller bubbles. In addition, the air discharging from the lower parts of the tubular membrane result in liquid pumpage which reduces the air bubble residence time and cuts down on the air transfer efficiency. Cylindrical diffusers are known to be inferior in oxygen transfer to flat diffusers having the same perforated area presented to the wastewater in the basin. Thus, despite the numerous benefits offered by cylindrical diffusers, they are in many respects inferior to flat diffusers for applications where oxygen transfer efficiency is the overriding consideration.

SUMMARY OF THE INVENTION

The present invention is directed to an improved diffuser mounting arrangement that is enhanced in strength, versatility and simplicity so that it is able to accommodate larger diffusers and handle greater forces than the mounting systems that have been used in the past. The invention is also directed to an improved diffuser construction that combines the structural attributes of tubular diffusers with the oxygen transfer benefits associated with flat plate diffusers.

In accordance with one aspect of the invention, a removable mounting saddle secured on the supply pipe has an outlet spout that may be directly connected to a Tee fitting used to mount elongated tubular diffusers. The direct connection between the wall of the saddle outlet and the T inlet may be a solvent welded connection or a threaded connection (or other suitable connection), and it eliminates the need for a separate pipe nipple to connect these two components. It also eliminates one connection and thus decreases the material and labor cost and increases the structural reliability of the mounting assembly. The diffusers are located closer to the supply pipe because of the interfit of the saddle outlet and the Tee fitting inlet. This is important in that it reduces the length of the lever arm applying leverage to the assembly and also in that it allows the piping to be located closer to the floor. It is also noteworthy that the saddle can be constructed to fit on standard U.S. piping or on standard metric piping, with the spout compatible with U.S. piping components in either case. As a result, the Tee fittings and diffusers can always be made from U.S. pipe sizes, whereas U.S. saddle components can be used for systems to be installed in the U.S. and metric saddle components can be used for systems to be installed in places where metric pipe sizes are prevalent.

The invention also contemplates a single saddle that is compatible with two different pipe sizes. According to this aspect of the invention, the saddle spout has an outside diameter compatible with one pipe size (such as a standard 3 inch Tee fitting). An insert is formed inside of the spout and has an inside diameter that is compatible with another pipe size (such as a standard 2 inch pipe). Accordingly, either pipe size can be used with the saddle. Again, this eliminates the need to manufacture a different saddle for each different pipe size.

Another aspect of the saddle mounting arrangement is that the saddle outlet spout may be constructed to be compatible with standard U.S. piping components as well as with standard metric piping components. This feature of the invention is achieved by providing the outlet spout with an outside diameter that is compatible with one system (U.S. or metric) and an inside diameter that is compatible with the other system. As a result, a single saddle can be used with either U.S. or metric components and there is no need for different saddles to be manufactured for the two different systems. At the same time, the advantages of a direct connection between the saddle outlet and Tee inlet are used.

The increased structural strength provided by the diffuser mounting arrangement is of particular benefit where larger and longer diffusers are to be employed. By way of example, the diffuser mounting arrangement disclosed in the aforementioned Tharp patent has been used to mount duplex tube diffusers that are each three inches in diameter and together span about seven feet. Present intentions are to use the mounting arrangement of the present invention to mount duplex tubular diffusers that are each four inches in diameter and together span about ten feet. This large increase in diffuser size results in a huge increase in the forces that must be handled, and the mounting assembly must be strong enough to withstand the greatly increased stress placed upon it. It is contemplated that even larger diffusers such as those having diameters of six inches or even eight inches will be used at times.

In order to take advantage of the benefits of both cylindrical and flat diffusers, the present invention provides a unique diffuser construction. The diffuser has a cylindrical inlet end and a flattened body that occupies the majority of the length of the diffuser tube. An apertured membrane is sleeved over the diffuser tube so that the air which discharges through the membrane into the wastewater is applied in the form of fine bubbles. The cylindrical shape of the inlet end of the diffuser allows it to be conveniently mounted by means of a saddle mounting assembly of the type disclosed in the present application and other mounting arrangements for cylindrical diffusers.

Preferably, only that part of the membrane which overlies the flat upper surface of the diffuser body is apertured. Consequently, the air is discharged only from the flat top surface of the diffuser, thus resulting in the diffuser functioning in the manner of a flat plate diffuser and taking advantage of the efficiency of the flat diffuser geometry. Problems of bubble coalescence that plague cylindrical diffusers are eliminated, as are their pumpage problems.

The membrane deflects upwardly from the diffuser body when the aeration equipment is in operation. Because of the flat surface of the membrane which overlies the top of the diffuser, the deflection at the center is greater than that at the side edges by only a short distance (1 inch, for example). Consequently, approximately the same amount of air discharges from all portions of the apertured part of the membrane, and this results in increase uniformity of the air distribution compared to that of a cylindrical structure. At the same time, the differential height between the center of the membrane and the side edges is small compared to what occurs with a cylindrical diffuser normally having a diameter of three inches or more. This permits a decrease in the system pressure and results in lower energy costs to operate the system.

Another advantage of this diffuser geometry is that the membrane deflects upwardly from the flat surface such that an air channel is provided to extend from the outboard end of the diffuser body along the entire length of the top surface of the diffuser body. Accordingly, the air distribution is uniform along the length of the diffuser, and it is necessary to provide only the single end outlet in the diffuser body in order to direct air out of the diffuser body and beneath the membrane. This is to be compared with cylindrical membranes where a number of outlet openings are required along the length of the diffuser body in order to achieve satisfactory air distribution along the diffuser length. Minimization of buoyancy is another advantage of this configuration. The volume inside of the diffuser is less in the flattened diffuser body than in the case of a cylindrical diffuser, and the buoyancy is reduced accordingly. The stresses caused by membrane shrinkage are reduced due to the flat diffuser design, and this increases the operating life of the membranes and creates attendant economic advantages.

DESCRIPTION OF THE DRAWINGS

In the accompanying drawings which form a part of the specification and are to be read in conjunction therewith and in which like reference numerals are used to indicate like parts in the various views:

FIG. 4 is a fragmentary top plan view of a wastewater treatment basin equipped with diffusers which are constructed in accordance with another embodiment of the invention;

FIG. 5 is a fragmentary sectional view taken generally along line 5—5 of FIG. 4 in the direction of the arrows, with a portion shown in section for purposes of illustration and the break lines indicating continuous length of the air diffuser;

FIG. 6 is a fragmentary sectional view similar to FIG. 5, but showing an alternative embodiment of the diffuser construction and mounting arrangement, with a portion shown in section for purposes of illustration;

FIG. 7 is a fragmentary sectional view similar to FIGS. 5 and 6 but showing another alternative mounting arrangement for the diffusers, with a portion shown in section for purposes of illustration;

DETAILED DESCRIPTION OF THE INVENTION

Figure 1:
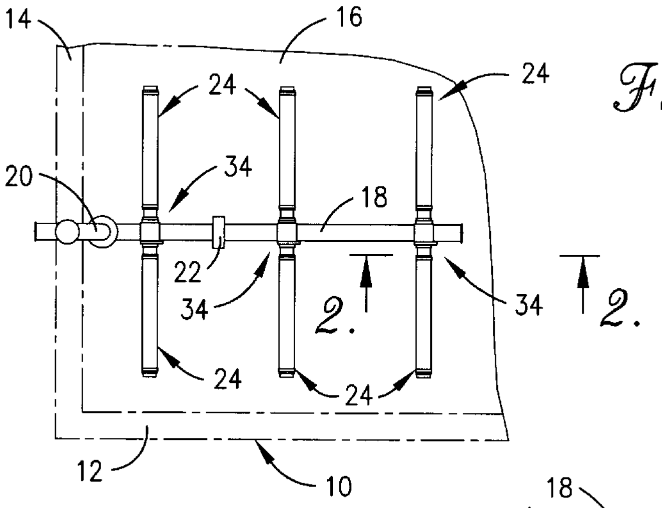
FIG. 1 is a fragmentary top plan view of a portion of a wastewater treatment basin equipped with a diffuser mounting arrangement constructed according to one embodiment of the present invention.

Referring now to the drawings in more detail and initially to FIG. 1, the present invention relates to the aeration and mixing of wastewater contained in a basin 10 of the type commonly used in wastewater treatment systems. The basin 10 is a concrete structure having opposite side walls, one of which is identified by numeral 12, and opposite end walls, one of which is identified by numeral 14. A concrete floor 16 underlies the basin. It should also be understood that the diffuser systems and mounting arrangements of the present invention may be used in earthen basins, steel tanks and other types of treatment facilities.

As is common with aeration-mixing systems used in wastewater treatment, air under pressure is supplied from a conventional blower (not shown) to a main header pipe (also not shown) which in turn supplies air to a plurality of air supply pipes such as the air lateral pipe 18 shown in FIG. 1. Each of the pipes 18 is submerged in the wastewater near the floor 16. The main air header typically extends outside of the basin and supplies air to the supply pipe 18 through a drop pipe 20 which extends downwardly into the basin to connection with the supply pipe 18. Pipe supports 22 are typically anchored to the basin floor 10 and serve to stabilize and support the air supply piping in the basin and counteract the buoyancy forces when the piping is filled with air. There are normally a number of the supply pipes 18 in the basin, and they may extend parallel to one another or be arranged in some other configuration.

Each of the supply pipes 18 supplies air to a plurality of elongated tubular diffusers which may be of the type generally identified by numeral 24 in FIG. 1. The diffusers 24 are arranged end to end in pairs, and the diffusers in each pair are normally located beneath the supply pipe 18. The diffusers in each pair extend horizontally away from one another on opposite sides of the supply pipe, and they are oriented generally perpendicular to the pipe 18.

Figure 2:
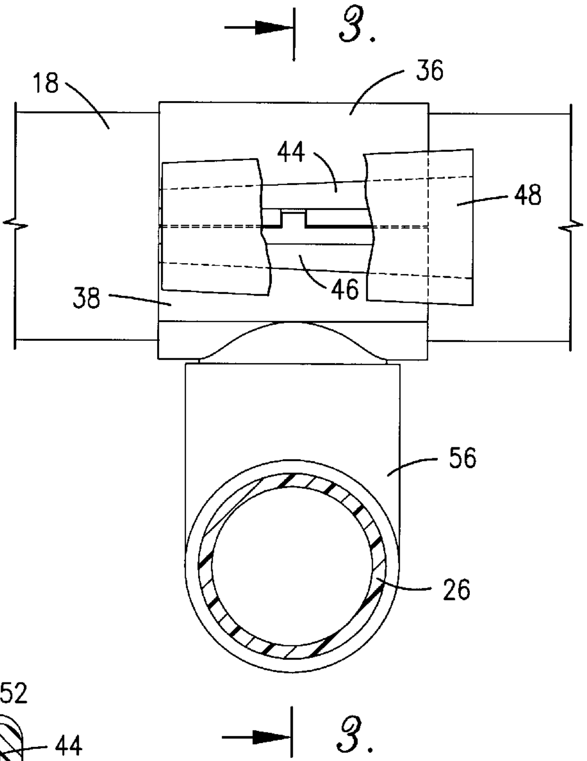
FIG. 2 is a fragmentary sectional view on an enlarged scale taken generally along line 2—2 of FIG. 1 in the direction of the arrows.
Figure 3:
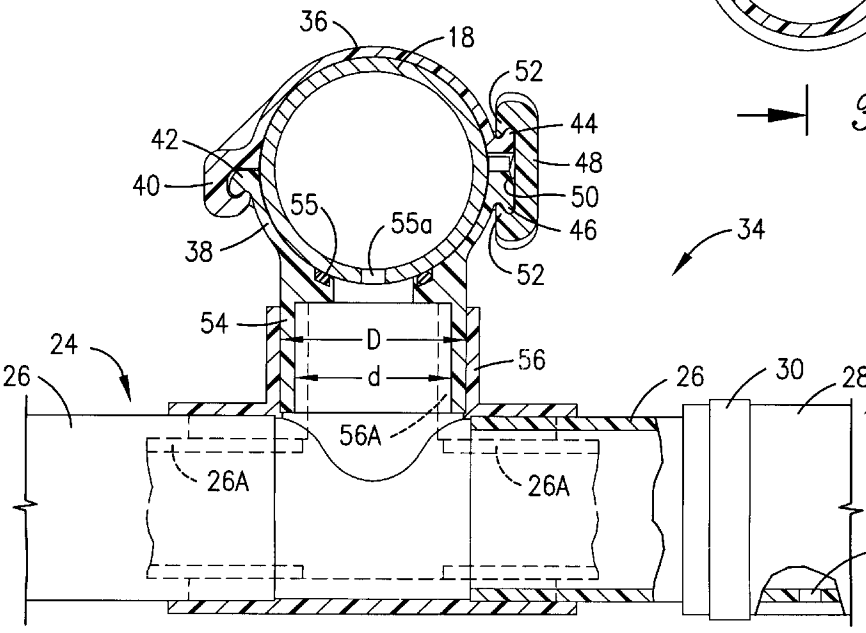
FIG. 3 is a fragmentary sectional view taken generally along line 3—3 of FIG. 2 in the direction of the arrows.

As shown additionally in FIGS. 2 and 3, each diffuser has a cylindrical body 26 which may take the form of a conventional plastic pipe such as a pipe constructed of polyvinyl chloride or another suitable substance. Each diffuser body 26 is plugged on its outer end. A flexible sleeve type membrane 28 is sleeved closely on each diffuser body 28 and is secured thereto by a pair of hose clamps 30 near its opposite ends. At a location within the membrane 28, one or more outlet ports 32 are formed through the wall of the diffuser body 26 in order to discharge air from the diffuser body to the membrane 28. Each membrane 28 is provided with a large number of small apertures or slits which are closed when the membrane is collapsed on the cylindrical diffuser body 26. However, when air is supplied to the diffuser body 26, the air pressure applied to the membrane through the ports 32 causes the membrane to expand outwardly away from the diffuser body, thus opening up the apertures so that the air discharges through the apertures into the wastewater in the form of fine bubbles. The construction and manner of operation of flexible membrane diffusers such as the diffusers 24 are well known to those skilled in the art.

In accordance with one aspect of the present invention, the diffusers 24 are mounted on the air supply pipe 18 by means of special mounting devices 34. Each of the mounting devices 34 is similar to that disclosed in U.S. Pat. No. 4,960,546 to Charles E. Tharp. A specially constructed saddle which is clamped securely onto the supply pipe 18 includes an upper saddle section 36 and a lower saddle section 38. The two saddle sections 36 and 38 are complemental and cooperate to expend essentially completely around the circumference of the pipe 18 in order to provide a double wall construction which structurally reinforces the supply pipe. When applied to the pipe, the saddle sections 36 and 38 cooperate to provide a cylinder having an inside diameter substantially equal to the outside diameter of the air supply pipe 18.

The upper saddle section 36 is semi-cylindrical and has on one edge a generally C-shaped flange 40. The lower saddle section 38 is also semi-cylindrical and has a projecting lip 42 on one edge. The lip 42 has a configuration to fit closely within the channel formed by the C-shaped flange 40. The fit of the lip 42 in the flange 40 provides a hinge about which the saddle sections 36 and 38 may be opened and closed. The edges of the saddle sections 36 and 38 opposite the flange 40 and lip 42 are provided with outwardly extending hooks 44 and 46, respectively.

A wedge fastener 48 is used to securely clamp the saddle sections 36 and 38 on the pipe 18. The fastener 48 is C-shaped in section and presents a channel 50 which is bounded at the top and bottom by tapered lips 52. As best shown in FIG. 2, the fastener 46 is wider at one end than at the other end and gradually tapers from end to end. Likewise, the channel 50 gradually decreases in width from one end of the fastener to the other end.

When the saddle sections have been applied to the pipe and closed on the pipe about the hinge provided by the mating channel 40 and lip 42, the wedge fastener 48 can be applied such that the hooks 44 and 46 are closely received in the channel 50. The fastener can then be tightened by sliding it lengthwise on the hooks until the saddle assembly is secured as tightly as desired on the pipe 18. The wedging action provided by the tapered channel 50 as the fastener is being applied assures that the saddle assembly will be secured on the pipe and will remain in place during operation of the aeration equipment. A mallet or other tool can be used to drive the fasteners onto the hooks 44 and 46 as far as necessary.

The lower saddle section 38 has a downwardly extending outlet spout 54 which is cylindrical in section. An O-ring 55 which is carried by the lower saddle section 38 provides a seal against the pipe at a location around a port 55A which is drilled through the wall of the supply pipe 18 to serve as an outlet for the air that is supplied to the pipe. The port 58 is aligned with the internal flow passage which is formed within the outlet spout 54.

In accordance with the present invention, the outlet spout 54 has an outside diameter D (see FIG. 3) which is compatible with a standard pipe component size, either U.S. or metric. This permits the spout 54 to fit within a standard piping component such as the center inlet leg of a Tee fitting 56. The outside surface of the wall of the spout 54 fits closely within and contacts the inside surface of the inlet of the Tee fitting 56. Consequently, the wall of the spout 54 may be fitted within and directly connected with the wall of the inlet leg of the Tee fitting 56, preferably by solvent welding although other forms of connections such as a threaded connection may be used. The inlet ends of the diffuser bodies 26 fit closely within and are connected with the two horizontal outlet legs of the Tee fitting 56, again preferably by solvent welding.

By way of example, the outside diameter of the spout 54 may be a nominal 3½ inches. The Tee fitting may be a standard 3 inch by 3 inch by 3 inch plastic pipe fitting (having a nominal 3½ inch inside diameter). The Tee fitting may be connected with the outlet spout 54 by means of a direct solvent weld connection between the inside surface of the inlet leg of the Tee fitting and the outside surface of the wall of the spout 54. Each of the diffuser bodies 26 may be constructed from a standard 3 inch plastic pipe (having an outside diameter of 3½ inches) which fits closely in and is solvent welded or otherwise connected with the outlet of the Tee fitting 56. This provides a strong construction and a strong mounting of the diffusers 24 which is able to withstand the considerable forces that are applied as the diffusers act in the manner of lever arms when they are discharging air during operation of the system. It is to be understood that sizes greater than 3 inches can be employed for the Tee outlets to accommodate larger diameter diffusers.

It is another particular feature of the invention that the inside diameter d (see FIG. 3) of the saddle outlet spout 54 is compatible in size with a standard pipe component which may be either U.S. or metric. Preferably, if the outside diameter D is compatible with a standard U.S. pipe component, the inside diameter is compatible with a standard metric pipe component. Conversely, if the outside diameter D is compatible with a metric pipe component, then the inside diameter d is preferably compatible with a standard U.S. pipe component.

This arrangement provides a benefit which is best depicted in FIG. 3. If it is desired to make use of standard metric pipe components rather than U.S. pipe components, a metric size Tee fitting 56A can be used instead of the U.S. size Tee fitting 54. Because the inside diameter d is compatible with the metric size, the metric Tee 56A can be fitted with its inlet leg received closely within the spout 54 and in direct contact with the inside surface of the spout, as depicted in broken lines in FIG. 3. The outside surface of the inlet leg of the Tee fitting 56A is directly connected with the inside surface of the wall of the spout 54, preferably by solvent welding although other connection means may be employed. Metric sized pipes may be used for the diffuser bodies 26A. Because the Tee fitting 56A has a standard metric size, the inlet ends of the diffuser bodies 26A may be fitted closely within the two outlet legs of the Tee fitting 56A and solvent welded or otherwise suitably connected with the Tee fitting. Again, this construction provides a strong mounting arrangement for the diffusers and is able to withstand the considerable forces that are applied during operation of the aeration system.

It is thus evident that the mounting arrangement shown in FIGS. 1–3 makes use of a single saddle assembly having an outlet that is compatible both with U.S. and metric size pipe components. Consequently, the same saddle can be produced for use in the U.S. where U.S. pipe components are prevalent and also for use elsewhere in the world where metric sizes are prevalent for piping components. The saddle components 36 and 38 can be formed to fit on a pipe 18 which is either metric or U.S.

In addition to this enhanced versatility, the mounting arrangement of the present invention has some distinct advantages over the mounting units that have been employed in the past, including that disclosed in U.S. Pat. No. 4,960,546. The unit shown in the patent requires a separate pipe nipple in order to connect the saddle outlet spout with the inlet to the Tee fitting used to mount the diffusers. The direct connection in the present invention between the saddle outlet spout and the Tee fitting inlet has several advantages. First of all, there is one less part needed and one less connection that must be made, thereby reducing the materials costs and the labor costs. The elimination of one connection also enhances the reliability because there is one less connection that could possibly fail.

Because the outlet spout from the saddle and the inlet leg of the Tee fitting fit one inside the other, the distance of the diffusers from the supply pipe is reduced, thus reducing the length of the lever arm that extends between the diffusers and the supply pipe. Reducing the length of this lever arm results in a reduction in the leverage effect and in the stress that is applied to the components of the saddle assembly. Also, the supply pipe 18 can be mounted closer to the floor which provides it with more stability in the basin, reduces the size of the hold down brackets 22 and results in an overall stronger arrangement of the piping in the basin.

When the units are factory assembled, the size of the crating can be reduced, and this reduces the cost of the crating and shipping. Finally, when the saddle outlet spout is received inside of the Tee fitting inlet, the surface area of the two components that is in contact is increased, and this increases the strength of the connection whether it be a solvent weld connection, threaded connection or other type of connection. By increasing the surface area and strength of the connection, there is a reduced likelihood that the connection will fail which is a particular concern in wastewaters that are hot and can possibly soften the piping components and weaken the connection.

It should also be recognized that diffusers that are larger in diameter and length are desirable in many applications involving wastewater treatment. The forces that are generated as the diffusers become larger increase dramatically with diffuser size increases. Consequently, although the mounting arrangement disclosed in U.S. Pat. No. 4,960,546 to Tharp has been widely used for diffusers up to three inches in diameter and about 3½ feet long, larger diffusers produce forces which require a mounting arrangement having even greater structural strength. By reason of the various factors previously pointed out, the mounting structure of the present invention exhibits enhanced strength and is thus able to handle the large forces applied by larger diffusers.

As best shown in FIG. 2, the wedge fastener 48 has a length that is somewhat greater than the length of the saddle formed by the two saddle components 36 and 38. This provides the channel 50 with a greater length and results in a greater range of closure for the fastener. If the pipe to which the unit is applied is somewhat oversized, the wedge fastener 48 can be applied to the extent necessary to hold the saddle assembly in place. Conversely, if the pipe is undersized, the wedge fastener can be applied to a greater extent in order to make certain that the saddle assembly is securely clamped in place. In this way, the tolerance in the pipe size can be readily accommodated.

Figure 10:
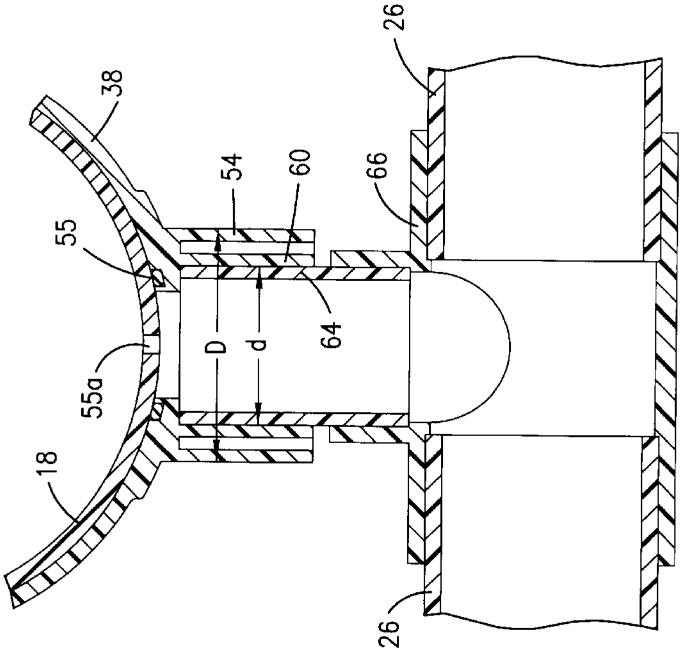
FIG. 10 is a fragmentary sectional view similar to FIG. 8, but showing an alternative manner of mounting diffusers in accordance with the present invention.
Figure 8:
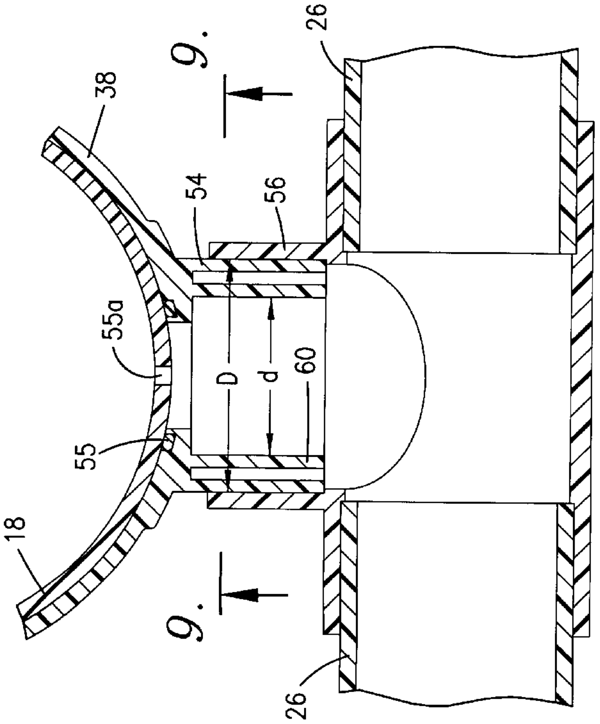
FIG. 8 is a fragmentary sectional view showing still another embodiment of the mounting arrangement of the present invention.
Figure 9:
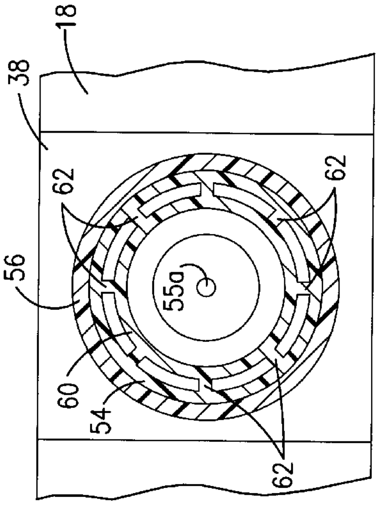
FIG. 9 is a fragmentary sectional view taken generally along line 9—9 of FIG. 8 in the direction of the arrows.

FIGS. 8–10 depict a diffuser mounting arrangement that is in many respects similar to that depicted in FIGS. 1–3. The difference is that the outlet structure of the lower saddle section 38 includes a cylindrical insert 60 which is concentric with and spaced inwardly from the cylindrical wall of spout 54. As best shown in FIG. 9, the insert 60 is connected with the wall of the spout 54 by a series of small ribs 62 which are circumferentially spaced around the insert. Preferably, the insert 62 is molded as a part of the lower saddle section 38.

Again, the outside diameter D of the spout is compatible with a standard Tee fitting which may be either U.S. or metric. By way of example, the outside diameter D of the spout may nominally be 3½ inches so that the spout can be fitted within and directly connected with the inside surface of the inlet leg of the standard 3"×3"×3" Tee fitting 56, as shown in FIG. 8. The diffuser bodies 26 may be connected with the outlet legs of the Tee fitting 56 in the manner described previously.

The inside diameter d of the insert 60 is compatible with another standard pipe size. For example, if the outside diameter D is compatible with a nominal 3 inch Tee fitting, the inside diameter d may be compatible with a standard 2 inch pipe (2½ inch outside diameter). This permits the diffuser bodies 26 to be mounted in the manner shown in FIG. 10. A 2 inch pipe nipple 64 (2½ inch outside diameter) may be fitted closely within the insert 60 with the outside surface of the nipple 64 in direct contact with the inside surface of the insert 60. A solvent weld or other type of connection can be made directly connecting these two parts. The lower end of the nipple 64 may be fitted closely within and suitably connected with the inlet leg of a Tee fitting 66 which may be a standard fitting having a 2 inch inlet (2½ inch inside diameter) and two 3 inch diameter outlets (nominal 3½ inch inside diameter). The diffuser bodies 26 may be fitted in and solvent welded or otherwise suitably secured to the outlets of the Tee fitting 66 in the manner described previously.

The mounting arrangement depicted in FIGS. 8–10 thus accommodates mounting of the diffusers with components which differ in size. The mounting arrangement shown in FIG. 8 is generally preferred because of the advantages described previously resulting from the interfit of the spout directly with the Tee fitting. However, if existing systems are to be upgraded or modified, the arrangement of FIG. 10 can be used without the concern of matching up the elevation of the diffusers exactly. The FIG. 10 arrangement is entirely compatible with installations of the type depicted in U.S. Pat. No. 4,960,546.

The arrangement of FIGS. 8–10 is particularly desirable in situations where the diffusers are manufactured in a factory with a single system (such as U.S. pipe sizes) and are to be installed on pipe that may be either U.S. or metric size. Thus, a U.S. manufacturer is likely to want to manufacture the diffusers and the pipe components for the diffusers in its U.S. plant to assure good quality for these critical products. For uniformity, convenience and expense reasons, the manufacturer is also likely to want to use pipe that is U.S. size for the diffusers. However, the long runs of piping on which the diffusers are mounted can be both U.S. size (for installations made in the U.S.) and metric size (for overseas installations). It is often economical for the piping to be purchased locally, especially if installed overseas. Thus, the manufacturer can provide saddles to fit on U.S. pipe with U.S. outlet sizes for U.S. installations and saddles to fit on metric pipe but still with U.S. outlet sizes for installations where metric piping is to be used. This enables the manufacturer to supply its standard U.S. diffuser piping, which is compatible with both types of saddles, in both situations.

FIGS. 4–5 illustrate a novel construction of elongate tubular diffusers which are generally identified by numeral 124. The diffusers 124 may be used in place of the diffusers 24 and may be mounted in the same manner or in some other manner if desired. Each of the diffusers 124 is constructed from an elongated plastic tube 126 which may originally be a conventional cylindrical plastic pipe. Each of the tubes 126 has a cylindrical inlet end 127 which is open on the end and which may be connected with the Tee fitting 56 in the manner described previously in connection with the diffusers 24. The majority of the length of each tube 126 serves as a body portion 129 which is flattened on the top and bottom. The flattened configuration of the body 129 may be provided by heating and forming the portion of the pipe that eventually becomes the body 129. A transition section 131 is formed on each diffuser tube 126 between the cylindrical inlet end 127 and the flattened body 129.

Each flattened body 129 has a generally flat upper wall 129A and a generally flat bottom wall 129B. As best shown in FIG. 4, the width dimension W of each flattened body 129 is greater than the diameter of the cylindrical inlet section 127. As shown in FIG. 5, the height dimension H of each flattened body is somewhat less than the diameter of the inlet section 127.

Each of the diffusers 124 includes a tube sock type flexible membrane 128 which is sleeved onto the diffuser tube. One end of each membrane 128 is open, and it is fitted on the cylindrical inlet end 127 of the tube. A single hose clamp 130 or similar means is used to secure the membrane on the tube at a location on the inlet end 127. The opposite or outer end of each membrane 128 is a closed end 128A which covers the outer end of the tube 126 and may be closed by heat sealing or otherwise. Consequently, there is no need to provide the tube 126 with an end plug nor is there a need for two hose clamps near the two ends of the membrane as is common with elongated tubular diffusers.

As shown in broken lines in FIG. 5, the end of tube 126 opposite the inlet end 127 is an open end 131 through which the air flows. The end 131 is preferably cut at an angle as shown, with the top part of the tube extending outwardly further than the bottom part. There is also excess membrane material beyond the end 131 to provide the membrane with shrinkage allowance. This arrangement allows the air to flow through the tube 126 and out the end 131. The air then flows upwardly and back along the flat top surface 129A of the tube between the tube and membrane. The top of the membrane expands and allows the air to release into the water through the membrane apertures in the form of fine bubbles.

A single optional outlet port 132 may be formed in the tube 126 at a location within the membrane 128. If present, the port 132 is preferably formed in the bottom wall 129B of the body 129 at a location adjacent to the transition section 131 of the tube.

The diffuser 124 can be mounted in any suitable manner and is depicted in FIG. 5 as being mounted with an arrangement of the type shown in FIG. 3. When air is applied to the air supply pipe 18, the air flows through the outlet spout 54 and through the Tee fitting 56 into the open end of the inlet section 127. The air flows out of the tube 126 through the end 131, thus deflecting the membrane 128 outwardly away from the body 129. The air then returns along the top of the flat surface 129A and creates a plenum on top of the diffuser body as the membrane expands upwardly on top of the diffuser. The air discharges into the wastewater through the apertures in the membrane which open when the membrane is deflected away from its supporting tube 126 and thus stretched.

Preferably, only the top half of the membrane 128 is perforated such that the apertures in the membrane are located only in that portion which overlies the flat top wall 129A of the body 129. With this arrangement, all of the air discharges out of the flat top portion of the membrane and there are no significant problems with coalescing of bubbles emerging from the sides or bottom. At the same time, the air distribution is enhanced because all of the apertures through which the air discharges into the wastewater are at nearly the same elevation. In a typical application, the membrane deflects upwardly along the longitudinal center of the top wall 129A a distance of about one inch. The side edges of the membrane do not deflect upward appreciably. This deflection forms an air channel along the length of the diffuser body so that air is able to reach all areas of the membrane top portion for uniform air distribution.

The diffuser configuration depicted in FIGS. 4 and 5 is advantageous because it maximizes the flat surface area which is known to enhance the efficiency of the air diffusion. At the same time, the inlet end 127 is maintained in a cylindrical configuration so that the diffusers can be mounted advantageously in the manner shown in FIG. 5. Even though the diffusers 124 have flat surfaces, they are still generally tubular in design, and their generally oval geometry takes advantage of the benefits of hoop stress and minimizes the stresses on the membranes in order to enhance their useful lives.

During operation of the system, the membrane deflects upwardly from the top wall 129A and thus provides a channel along the entire length of the top of the diffuser for the air to occupy and flow throughout the top surface of the diffuser. Because the air flows out through the outboard end 131, the diffuser construction minimizes the head loss of the system, minimizes the construction cost of the diffuser and reduces energy usage. The membrane deflects upwardly a distance of about one inch or less in the center compared to the side edges under normal operating conditions. Thus, the differential height is only about one inch compared to a 2 or 3 inch differential with tubular diffusers which are generally in the range of about 2–3 inches in diameter.

The diffuser configuration has substantial benefits in countering the effects of membrane shrinkage. Disk and panel type membrane diffusers must restrain the membrane at the edges, and there can be no slippage there. Due to the lose of plasticizers and solvents from the membrane material (usually rubber or a similar material), the membranes inevitably shrink. If the edges are restrained, the membrane shrinkage produces large stresses which can rupture the membrane, cause it to harden, or otherwise damage it. If the membrane hardens as it is prone to do with disk and panel units because of the restrained edges, increased pressure is required to effect expansion of the membrane. With tube diffusers, the shrinkage causes the membrane to become unduly tight on its support tube, thus requiring more pressure to expand the membrane. In any event, the shrinkage can result in a dramatic increase in the pressure drop through the system.

In comparison, the diffuser 124 of the present invention provides the full diameter of the membrane to accommodate shrinkage. When shrinkage occurs, the "sacrificial" membrane material on the bottom part of the diffuser body is able to slip so that the top part can expand much as when there has been no shrinkage. Because the air pressure is applied to the top of the membrane, the top deflects as intended to maintain a large volume air channel or plenum, even though the membrane may be snug at the bottom and side edges of the diffuser body. This is an important attribute the diffuser of the present invention exhibits, and it may effectively double the membrane life.

As for longitudinal shrinkage of the membrane, the excess membrane material beyond the end 131 of the diffuser tube provides sufficient slack to accommodate any lengthwise membrane shrinkage. It is contemplated that there will be about 1–1½ inches of excess membrane beyond the end of the tube to permit the entire membrane to shorten without adversely affecting the pressure drop.

The buoyancy of the diffuser assembly is reduced in comparison with a cylindrical diffuser of the same size, as the volume of the flattened diffuser body is less than that of a cylinder. The flattened geometry allows the end 128A of the membrane to be closed by heat sealing or otherwise, and this eliminates the machining required for the installation of a removable plug. Also, a single clamp 130 can be used to hold each membrane in place rather than requiring two clamps as is necessary with cylindrical diffuser tubes.

FIG. 6 depicts a diffuser construction that is similar to that shown in FIGS. 4–5. However, both of the diffusers 224 in each diffuser pair are formed as part of a single long tube which is flattened on its opposite end portions to form flattened bodies 229 which are each identical to the flattened body 129 and previously described. The two diffusers 224 are connected by an integral central section 233 which provides the air inlet to both of the diffuser tubes. The tubes on opposite sides of the center section 233 are each provided with a flexible membrane 228 which is identical to the membrane 128.

In the arrangement of FIG. 6, rather than using a Tee fitting for mounting of the diffusers, a saddle unit 235 is used for this purpose. The saddle unit 235 may be identical to the one shown in FIG. 3, except that the saddle 235 has a size to fit closely on the center section 233 of the diffuser tube. The saddle 235 has a spout 237 which forms an inlet to the diffuser assembly and fits closely around the outlet spout 54. The spouts 54 and 237 may be directly solvent welded or otherwise connected together, thus securing the saddle unit 235 to the saddle unit mounted on the supply pipe 18. The diffuser assembly is mounted by closing the saddle unit 235 on the center section 233 of the diffuser tube and securing the saddle unit 235 on section 233 by tightening the wedge fastener forming part of the saddle unit. An inlet port 239 is formed in the wall of the center section 233 in alignment with the spout 54 in order to admit air to the diffuser tube. The diffusers 224 operate in the same manner as the diffusers 124 previously described.

FIG. 7 depicts an alternative arrangement for mounting the diffusers 224. A half saddle 335 of generally semi-cylindrical shape has an integral spout 337 which closely receives the spout 54 of the saddle assembly mounted on the supply pipe 18. The spouts 54 and 337 may be solvent welded together. The half saddle 335 is in turn solvent welded to the upper portion of the center section 233, thus mounting the diffusers 224 to the supply pipe. An inlet port 339 is formed in the wall of the center section 233 in alignment with the spout 56 in order to admit air into the diffuser tube.

The flattened tubular configuration of the diffusers shown in FIGS. 4–7 makes them well suited for use in a variety of applications, including low density systems to full floor cover systems. In all applications, the diffuser takes advantage of the structural benefits of tubular diffusers and the oxygen transfer efficiency associated with traditional fine pore flat diffusers. The diffusers are well suited for mounting through use of saddle mounting arrangements so that a basin operating as a low density system can be upgraded to a full floor cover system simply by drilling additional outlet ports in the supply piping and adding diffuser assemblies attached to the piping by additional saddle mounting units.

By way of example, the diffuser assemblies can be mounted on the pipe side by side with the edges of adjacent diffusers touching or nearly touching. A typical diffuser assembly having diffusers 4 feet long and about 7 inches wide can be arranged side by side with other identical assemblies. Arranging 12 to 20 diffuser assemblies in this manner would provide what is equivalent to a large panel diffuser on each side of the pipe, as a 12 unit arrangement would be about 4 feet by 7 feet in membrane exposure and a 20 unit arrangement would be about 4 feet by 11 feet 8 inches in membrane exposure. A system arranged in this fashion can provide the efficiency benefits of full floor cover and the structural benefits of tubular diffusers. At the same time, the membrane retention problems, stress problems and high pressure drops associated with large panel diffusers are avoided. Rather than being clamped at the edges and basically unsupported elsewhere as is the case with a panel membrane, the tubular geometry employs a tube beneath the entirety of the membrane to distribute and minimize membrane stress and provide superior structural capability.

Because the individual diffusers are much smaller than panel diffusers, the distribution of air across the membrane is well controlled so that the system can operate with a normal pressure drop and does not require the increased pressure drop associated with panel diffusers. The tubular diffusers can be mounted on the piping at a location off of the floor where solids that tend to settle can fall past the diffusers onto the floor to avoid excessive accumulations on the membranes that can cause damage and inefficiency.

The diffusers of the present invention are also advantageous over disk diffusers in several respects. Most notably, the number of diffusers required is about one-sixth the number required in a traditional disk diffuser system. The piping requirements are only about one-third to one-fifth compared to a conventional disk diffuser system. Conventional membrane materials and mounting techniques can be employed because of the modest stresses applied to the membrane.

The considerably enhanced strength offered by the saddle mounting arrangement of the present invention makes it particularly well suited for mounting the flattened diffuser structures compared to a conventional tubular membrane diffuser which discharges air through almost the entire circumference of the membrane, the flattened diffuser makes use of only the top part of the membrane so that there is a loss of about one half of the active membrane surface. Accordingly, in order to recover or partially recover the membrane surface, the flat diffuser will normally be constructed from a larger diameter pipe. For example, whereas tubular diffusers of 3 inch diameter have been used, the standard for the flattened diffusers may be four inch diameter, or even six or eight inch diameter. The length can also increase, say from current span of about seven feet for a diffuser pair to about ten feet for a pair of the flattened diffusers.

These size increases greatly increase the forces that the mounting components must withstand. In addition to the increase in the diameter, length and displacement, the flat configuration also can increase the vibratory load applied from the diffusers back to the connecting parts. Due to the increased forces that must be resisted, the flattened diffusers require especially strong mounting arrangements such as those of the present invention.

From the foregoing it will be seen that this invention is one well adapted to attain all the ends and objects hereinabove set forth, together with the other advantages which are obvious and which are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described the invention, I claim:

1. Aeration apparatus for a wastewater treatment basin containing wastewater, said apparatus comprising:

an air supply pipe for immersion in the wastewater said air supply pipe presenting an outlet port;

a pair of saddle sections removably secured on said supply pipe at the location of the outlet port, said saddle sections cooperating to extend around the supply pipe for structural reinforcement thereof at the outlet port location;

an outlet spout on one of said saddle sections aligned with said outlet port to receive air therefrom, said spout having a generally cylindrical wall and extending substantially vertically;

a Tee fitting having an inlet section presenting a generally cylindrical wall and a pair of axially aligned outlet sections each having substantially the same configuration and size;

means for connecting said walls of the spout and inlet section directly together with one of said walls inside of and in contact with the other of said walls in a concentric arrangement providing a double wall construction, said double walled construction extending substantially the entire length of the Tee fitting inlet section and substantially the entire length of the outlet spout, thereby connecting said Tee fitting with said spout such that said outlet sections of the Tee fitting extend substantially horizontally; and a pair of elongate tubular diffusers connected with the respective outlet sections of said Tee fitting in generally horizontal extension therefrom in opposite directions, each diffuser having means for discharging air bubbles into the wastewater.

2. The apparatus of claim 1, wherein each diffuser comprises:

a tube having a generally cylindrical inlet end connected with said Tee fitting and a body presenting a width dimension greater than the diameter of the inlet end and a height dimension less than the diameter of the inlet end, said body having generally flat top and bottom surfaces and said tube having an outlet opening for discharging air from the body; and a flexible membrane sleeved onto said body and having a plurality of small apertures which open when air is applied within the membrane through said outlet opening, said apertures thereby discharging air into the wastewater in the form of bubbles.

3. The apparatus of claim 2, wherein said membrane has a closed end opposite the inlet end of said tube.

4. The apparatus of claim 2, wherein said apertures are located only in a portion of said membrane which overlies the top surface of said body.

5. The apparatus of claim 1, wherein said walls of the outlet spout are inside of and in contact with said walls of the inlet section of said Tee fitting.

* * * * *